Patented July 8, 1941

2,248,749

UNITED STATES PATENT OFFICE 2,248,749

COMPOSITION OF MATTER

Rudolf Engelhardt, Leverkusen-I. G. Werk, and Claus Heuck, Ludswigshafen-on-the-Rhine, Germany, assignors, by mesne assignments, to Jasco Incorporated, a corporation of Louisiana No Drawing. Application September 3, 1937, Serial No. 162,338. In Germany September 15, 1936

2 Claims. (Cl. 260—36)

The present invention relates to a new composition of matter of wax-like nature.

Mixtures of chlorinated naphthalenes of an average chlorine content of about 40% to about 60% are of a wax-like nature. Their consistency is a factor in favor of their use as dielectric media, for insulating purposes and for the fireproofing of wood and textiles.

Many attempts at improving these properties have already been made; however no clear success has been reached up to the present time. Thus, the addition of paraffins, resins, pitches or bitumen though having a certain homogenizing and plasticizing effect impairs the products in other respects; the addition of resins effects a hardening and rendering brittle of the products at lower temperatures; bitumen and natural waxes, such as paraffins or ozokerite, in order to induce to the chlorinated naphthalene a sufficient plasticity down to about 0° C. must be added in so high a proportion that the melting point is lowered and the fireproof property of the chlorinated naphthalenes is considerably decreased.

It is the object of the present invention to do away with these disadvantages and to increase the homogeneity and plasticity of the chlorinated naphthalenes without impairing the other valuable properties. With these and other objects in view this invention primarily consists in the incorporation within the chlorinated naphthalenes of polymerizates of isobutylene. Preferably such polymerizates are employed as have a molecular weight between 10,000 and 50,000. Depending on the amount of polymerizates added to the chlorinated naphthalenes the mixture is still plastic at 0° C. or at lower temperatures. Thus, a mixture of 90 parts of a chlorinated naphthalene of an average chlorine content of about 59–60% and a dropping point of 133° C. and 10 parts of a polymerized isobutylene of a molecular weight of 15,000 is still plastic at minus 20° C., the other properties of the chlorinated naphthalenes including the dropping point being practically unaltered. The same is true of a mixture of the same ingredients in the proportion of 80 to 20 with the exception that it is still plastic at minus 30° C. Lower chlorinated naphthalenes, such as those of an average chlorine content of about 50% having admixed therewith about 20% of a polymerized isobutylene of a molecular weight of about 35,000 show the lowest limit of plasticity at about minus 40° C. Generally the chlorinated naphthalenes are employed in excess over the polymerized isobutylene. It is worthy of note that the fireproof property of the chlorinated naphthalenes is not substantially impaired by the addition of up to about 20% of the polymerized isobutylenes. The new mixtures are characterized by their showing a contraction of only about 8% on cooling from about 150° to about 20° C.; in contradistinction thereto, mixtures of chlorinated naphthalenes and paraffine or ozokerite show a contraction, under the same conditions, of about 20%, whereas pure chlorinated naphthalenes show a contraction of about 11.

The valuable properties of the above described mixtures of chlorinated naphthalenes and polymerized isobutylene, viz. the high dropping point, the good plasticity at low temperatures, and the fireproof property, permit of the addition thereto of small amounts of other materials without impairing the properties to a material extent. Thus, the adhesive power of the said mixtures can be still further improved by the addition of a small proportion of a resin, such as colophony and/or of bitumen. The following are examples of such mixtures:

| | Parts |
|---|---|
| Chlorinated naphthalene with an average chlorine content of about 59% | 80 |
| Polymerized isobutylene with a molecular weight of 30,000 to 40,000 | 10 |
| Colophony | 1 |
| And/or bitumen | 5 |

All these mixtures, owing to their dielectric constant of 3–4, their electric loss of about $3-5 \times 10^{-4}$, and their insulating capacity of $1 \times 10^{16}$ ohm×cm. represent valuable materials for the insulating and impregnating of cable coatings.

The new mixture can be obtained as pure white products and can be dyed with suitable dyestuffs in all shades.

We claim:

1. The wax-like composition of matter comprising a preponderant amount of wax-like chlorinated naphthalenes and a smaller amount of polymerized isobutylene.

2. The wax-like composition of matter as claimed in claim 1 wherein the polymerized isobutylene has a molecular weight between about 10,000 and about 50,000.

RUDOLF ENGELHARDT.
CLAUS HEUCK.